United States Patent
Lowles et al.

(10) Patent No.: US 7,983,722 B2
(45) Date of Patent: Jul. 19, 2011

(54) HEADSET WITH MULTI-BUTTON CONTROL FOR A MOBILE COMMUNICATION DEVICE

(75) Inventors: Robert J. Lowles, Waterloo (CA); Edward Hui, Waterloo (CA); David Mak-Fan, Waterloo (CA)

(73) Assignee: Research In Motion Limited (CA)

( * ) Notice: Subject to any disclaimer, the term of this patent is extended or adjusted under 35 U.S.C. 154(b) by 909 days.

(21) Appl. No.: 11/693,054

(22) Filed: Mar. 29, 2007

(65) Prior Publication Data

US 2008/0242378 A1    Oct. 2, 2008

(51) Int. Cl.
*H04M 1/00*    (2006.01)
(52) U.S. Cl. ............... 455/575.2; 455/420; 455/41.2; 455/552.1; 455/556.1
(58) Field of Classification Search ............... 455/575.2, 455/569, 550, 517, 566, 66.1, 414.1, 90.3, 455/575.1, 41.3, 41.2; 381/74, 309, 17, 1; 340/533; 398/106; 330/251, 255, 264
See application file for complete search history.

(56) References Cited

U.S. PATENT DOCUMENTS

| | | | |
|---|---|---|---|
| 4,389,544 A * | 6/1983 | Wagner et al. ............... | 370/294 |
| 5,058,155 A | 10/1991 | Larsen | |
| 5,296,641 A * | 3/1994 | Stelzel ............... | 84/602 |
| 6,470,197 B1 | 10/2002 | Tuoriniemi et al. | |
| 6,559,866 B2 * | 5/2003 | Kolde et al. ............... | 715/765 |
| 7,013,009 B2 * | 3/2006 | Warren ............... | 379/420.01 |
| 7,047,326 B1 * | 5/2006 | Crosbie et al. ............... | 710/16 |
| 2003/0083114 A1 * | 5/2003 | Lavin et al. ............... | 455/569 |
| 2004/0136522 A1 * | 7/2004 | Wurtz ............... | 379/430 |
| 2004/0196991 A1 * | 10/2004 | Iida et al. ............... | 381/309 |
| 2004/0203975 A1 | 10/2004 | Chen et al. | |
| 2005/0026560 A1 * | 2/2005 | Villaverde et al. ............ | 455/3.06 |
| 2005/0221859 A1 * | 10/2005 | Wang et al. ............... | 455/557 |
| 2006/0084504 A1 * | 4/2006 | Chan et al. ............... | 463/39 |
| 2006/0090246 A1 * | 5/2006 | Cozens et al. ............... | 2/209 |
| 2006/0166716 A1 * | 7/2006 | Seshadri et al. ............ | 455/575.2 |
| 2006/0234771 A1 | 10/2006 | Shavrov | |
| 2007/0121959 A1 * | 5/2007 | Philipp ............... | 381/74 |
| 2008/0057858 A1 * | 3/2008 | Smith ............... | 455/3.05 |
| 2008/0164770 A1 * | 7/2008 | Terlizzi ............... | 307/125 |
| 2008/0164994 A1 * | 7/2008 | Johnson et al. ............... | 340/533 |
| 2009/0016728 A1 * | 1/2009 | Kindle ............... | 398/106 |
| 2009/0117945 A1 * | 5/2009 | Mahler et al. ............... | 455/569.1 |

(Continued)

FOREIGN PATENT DOCUMENTS

CN    02127140.2    1/2004

(Continued)

OTHER PUBLICATIONS

European Patent Office, Examination Report of European Patent Application No. 07105171.8, May 29, 2009.

(Continued)

*Primary Examiner* — Tan Trinh

(74) *Attorney, Agent, or Firm* — Cantor Colburn LLP

(57) ABSTRACT

The invention is directed at a headset for a mobile communication device having a multi-button control and is implemented with a standard headset jack. The multi-button control is decoded by a microprocessor after which an encoded signal is then transmitted from the processor to the handset. In this manner, by using the standard jack, no additional hardware is required on the handset.

17 Claims, 6 Drawing Sheets

U.S. PATENT DOCUMENTS

| | | | |
|---|---|---|---|
| 2009/0216068 A1* | 8/2009 | Thomas et al. | 600/14 |
| 2009/0247245 A1* | 10/2009 | Strawn et al. | 455/575.2 |
| 2009/0318085 A1* | 12/2009 | Seshadri et al. | 455/41.3 |

FOREIGN PATENT DOCUMENTS

| | | | |
|---|---|---|---|
| DE | 19909806 | | 1/2000 |
| WO | 9903294 | | 1/1999 |
| WO | 0065803 | | 11/2000 |
| WO | 0070779 | | 11/2000 |
| WO | WO 00/65803 | * | 11/2000 |
| WO | WO 00/70779 | * | 11/2000 |
| WO | 2007/0024566 | | 3/2007 |

OTHER PUBLICATIONS

Nokia Music Headset HS-45, AD-43 Description, downloaded from http://www.mobileplanet.com/d.aspx?i=149862 on Sep. 13, 2007.

Nokia Display Headset HS-69, downloaded from http://www.nokia.co.uk/A4221246 on Jul. 26, 2007.

Euopean Patent Office, Extended European Search Report for EP Patent App. No. 10164613.1, Jul. 9, 2010.

C.A. Application No. 2,626,654; Office Action; Date Mailed: Feb. 25, 2011.

C.N. Application No. 200810085872.7; Office Action with English Translation; Date Mailed: Nov. 12, 2010.

\* cited by examiner

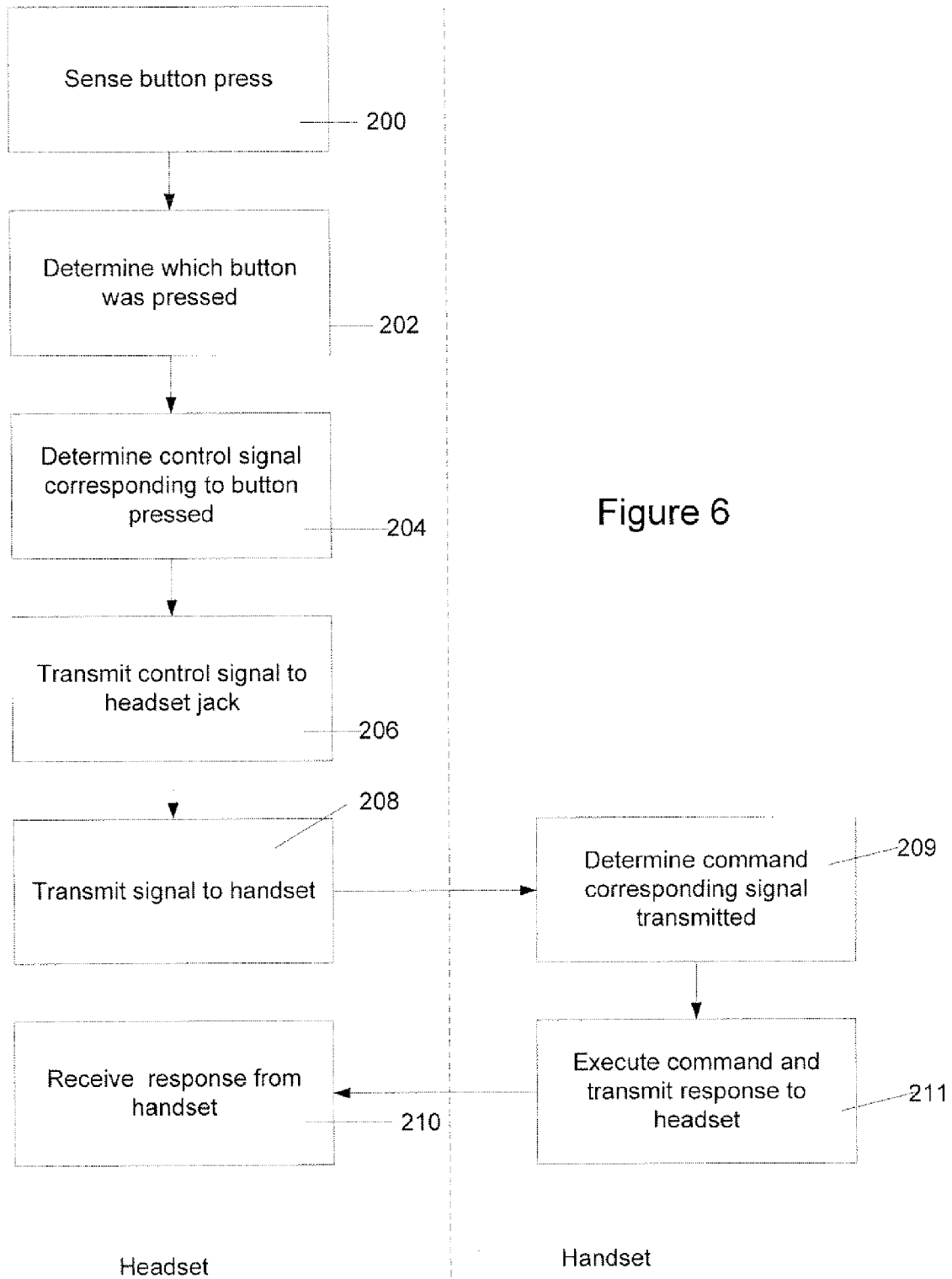

HEADSET WITH MULTI-BUTTON CONTROL FOR A MOBILE COMMUNICATION DEVICE

FIELD OF THE INVENTION

The present invention relates generally to headsets for a mobile communication device. More particularly, the present invention relates to a headset for a mobile communication device having a multi-button control and a standard headset jack.

BACKGROUND OF THE INVENTION

When mobile communication devices were first developed, their main functionality was to provide a way for individuals to communicate with other individuals without the need for a landline. As the mobile communication device technology improved, further functionalities such as email, a contact database or a calendar were added. In the latest wave of mobile communication devices, new functionality such as an MP3 player and cameras have been added resulting in a multi-purpose mobile communication device.

In order for users to listen to an MP3 player, a headset is typically required which preferably includes a remote control so that the user is able to control the MP3 player within the mobile communication device. However, these headsets are typically individualized for each mobile communication device. Existing headsets include non-standard headset jacks which are then plugged into a corresponding slot within the unique mobile communication device. Therefore users are required to buy a specific headset which is dependent on the mobile communication device they are using.

Currently, headsets with standard jacks which are used with mobile communication devices have only a single button which is used to mute a call or to initiate voice activated dialing. Typically a single press, or a long press, can activate different functions. However, these single button controls can only provide two different control signals.

Alternatively, some headsets with multiple button controls are implemented with non-standard jacks and thusly, the mobile communication devices are required to be updated in order to be able to receive the non-standard jack. Therefore, additional hardware is required in each mobile communication device in order to receive the non-standard jack. Additional conductors are also required in each of the headsets.

It is, therefore, desirable to provide a novel headset for a mobile communication device having a multi-button control using a standard headset jack.

BRIEF DESCRIPTION OF THE DRAWINGS

Embodiments of the present invention will now be described, by way of example only, with reference to the attached Figures, wherein:

FIG. 6 is a flowchart outlining a method of headset use.

DETAILED DESCRIPTION

Generally, the present embodiment provides a method and system for a headset for a mobile communication device. The headset includes a multi-button control and uses a standard jack for connecting to the mobile communication device.

SUMMARY OF THE INVENTION

The invention is directed at a headset for a mobile communication device having a multi-button control and is implemented with a standard headset jack. The multi-buttons control is decoded by a microprocessor after which an encoded signal is then transmitted, via the microphone line from the processor to the handset. In this manner, by using the standard jack, no additional hardware is required in the handset. Only software to decode the signal on the microphone input is required on the handset.

In one embodiment, there is provided, a headset, including a standard headset jack, having a multi-button control for activating commands on a mobile communication device, the multi-button control comprising a plurality of buttons, each representing at least one of the commands; and a controller, connected to each of the set of buttons; wherein when the controller detects the depression of one of the buttons, the controller determines which button was pressed and transmits a control signal to the mobile communication device corresponding to the button.

In a further embodiment, there is provided a headset for a mobile communication device comprising a set of speakers for transmitting sound from the mobile communication device to a user; a multi-button control for controlling sound from the mobile communication device; and a standard jack for connecting the headset to the mobile communication device and for transmitting signals from the multi-button control to the mobile communication device to provide sound to the speakers.

Figure 1:
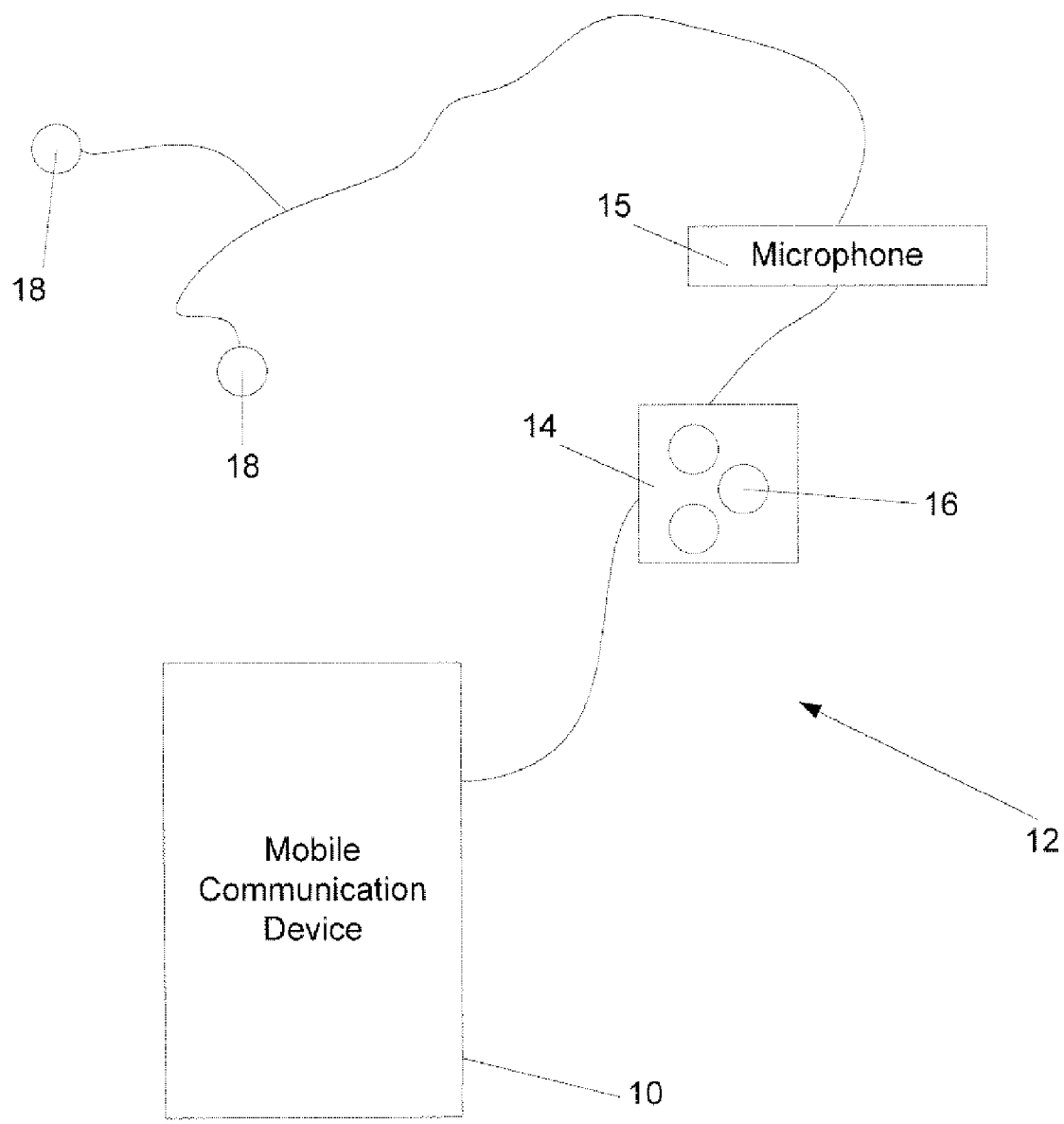
FIG. 1 is a schematic diagram of a mobile communication device and headset.
Figure 2:
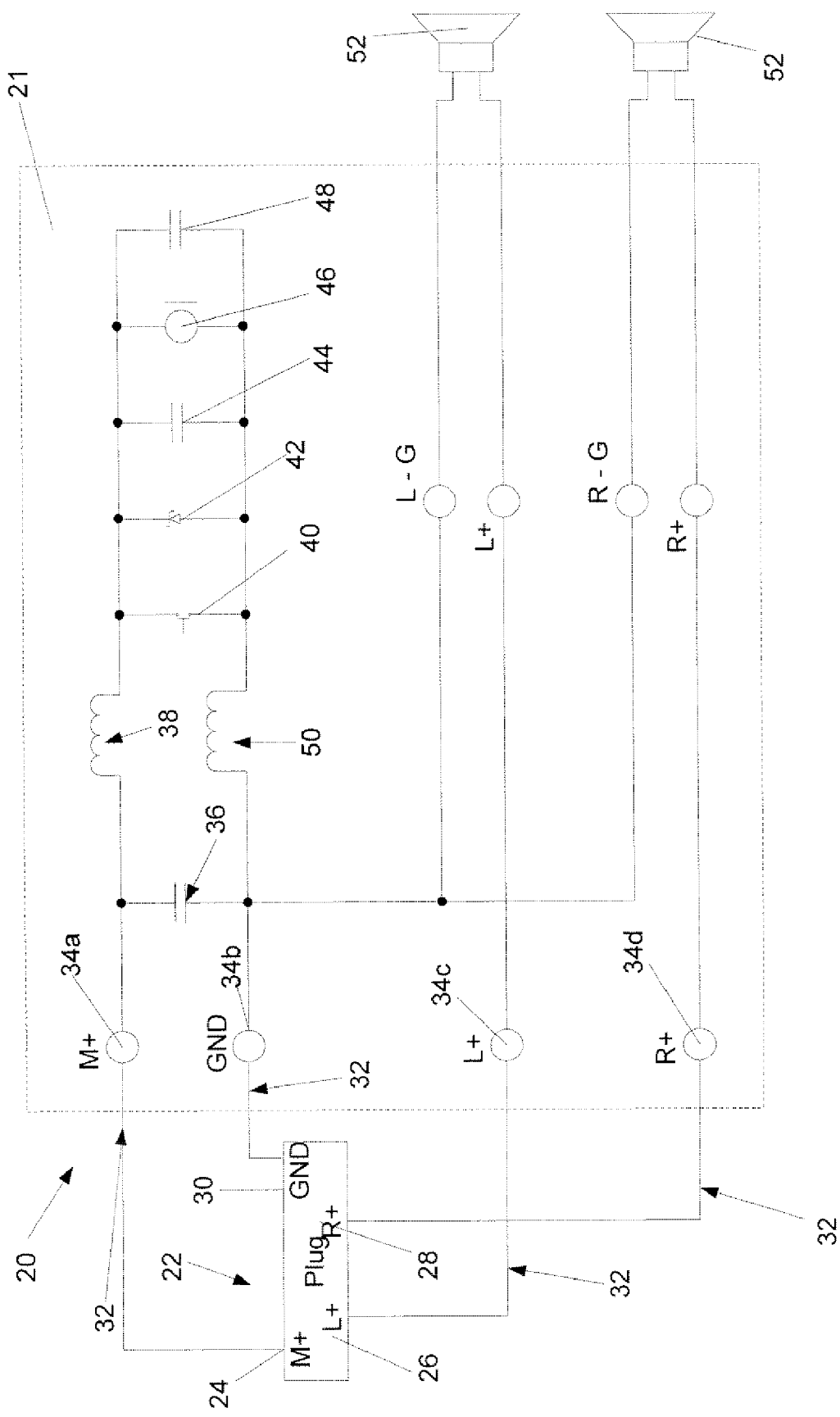
FIG. 2 is a schematic diagram of circuitry for a headset.

Turning to FIG. 1, a schematic diagram of a mobile communication device, or handset, 10 having a headset 12 thereby connected is provided. The headset 12 further comprises a multiple button controller 14 having a plurality of buttons 16. The number of buttons is theoretically limitless however, the number is dictated by the size of the controller 14. The headset 12 further includes at least one ear bud 18 each housing a speaker (as shown in FIG. 2). The headset 12 is connected to the mobile communication device 10 via standard jack. A microphone 15 is also included in the headset 12.

Turning to FIG. 2, circuitry 20, typically mounted to a printed circuit board assembly 21, for a standard headset 12 is shown. The headset 12 includes a standard jack, or plug, 22 for connecting the headset to the handset. The plug 22 comprises a microphone portion 24, a left speaker portion 26, a right speaker portion 28 and a ground portion 30. The jack 22 is connected to the circuitry 20 via a plurality of wires 32.

In the current embodiment, the circuitry 20 comprises a set of connectors 34 for receiving the wires 32 from their corresponding locations within the jack 22. The microphone connector 34a is connected to a first capacitor 36 and an inductor 38. An output of the inductor 38 is connected to plurality of elements connected in parallel. The plurality of elements includes a switch 40, a zener diode 42, a second capacitor 44, a microphone 46 and a third capacitor 48. A second inductor 50 is located between the ground connector 34b and the output of the parallel elements. The output from the second inductor 50 is connected to ground along with one side of a pair of speakers 52. The left speaker portion connector 34c and the right speaker portion connector 34d are also connected to their respective, left and right speakers 52. As will be understood, the speakers are typically located within the ear buds 18 of the headset 12 which are then inserted into a user's ears so that they may listen of the output from the mobile communication device.

In operation, the zener diode 42 is used to control the electrostatic discharge (ESD) which may be experienced within the headset 12. The inductor 38 and the first capacitor 36 provide a wide band filter for the various General Packet radio Services (GPRS) bands. This filter reduces and/or prevents the headset from picking up and transmitting GSM pulses via the microphone line. This is also known as GSM buzz. Finally, the switch 40 shorts out the microphone bias current which is detected by the handset as a signal.

Figure 3:
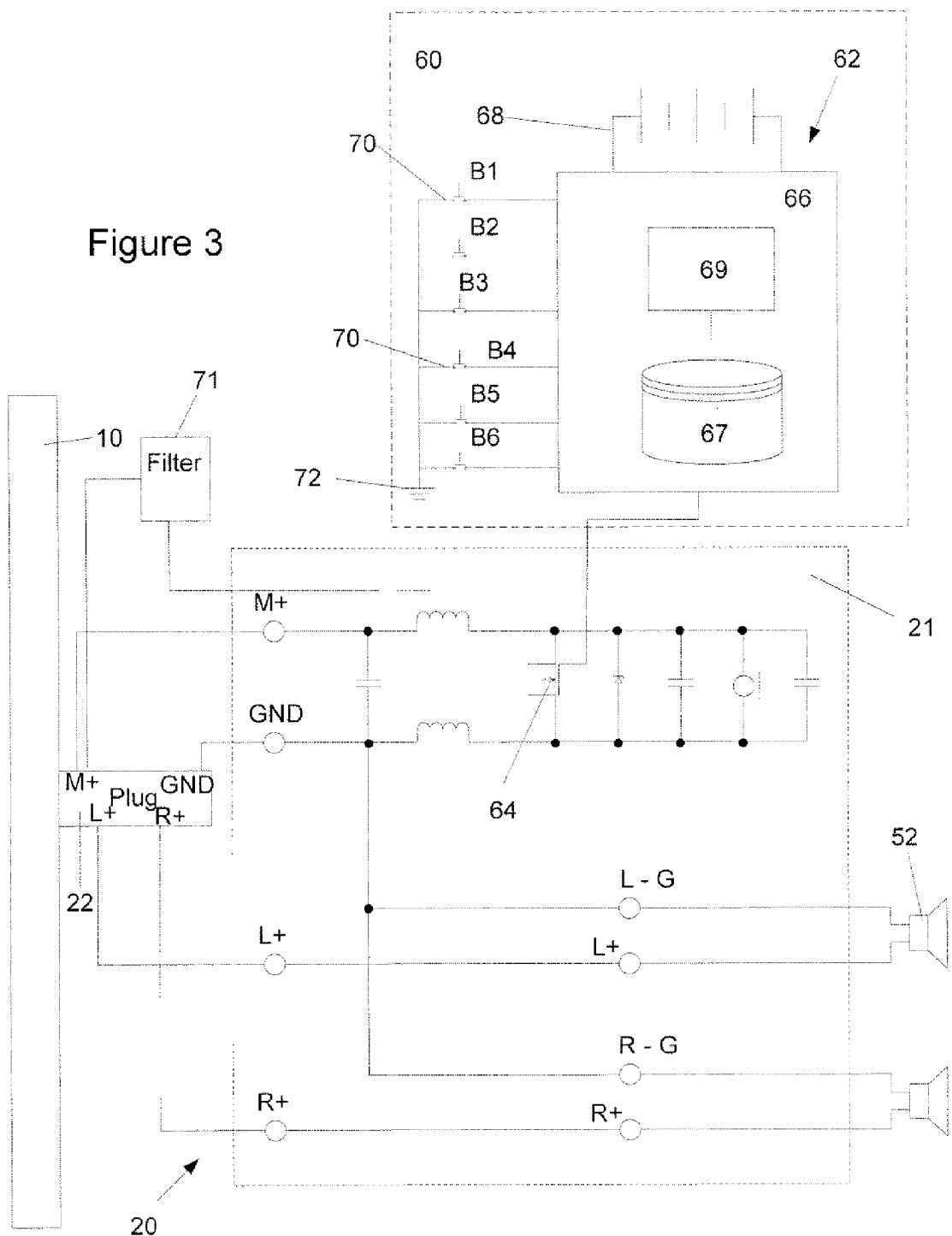
FIG. 3 is a schematic diagram of circuitry for a headset in accordance with an embodiment.

Turning to FIG. 3, a schematic diagram of an embodiment of a headset 12 having a multi-button control 60 in accordance with one embodiment is shown. In each of the embodiments, the headset 12 is implemented with the standard headset jack 22 for connection with the mobile communication device 10. In this embodiment, the circuitry 62 for implementing the multi-button control 60 is shown connected to the standard headset circuitry 20 of FIG. 2 with one substitution. The switch 40 is replaced with a Field-Effect Transistor (FET) 64. The implementation of the multi-button control using a standard headset and standard jack provides the benefit that mobile communication devices do not have to be altered in order to operate with the headset. In this manner, since the mobile communication device does not have to be updated to include extra hardware to receive the headset jack, the mobile communication device may be able to receive the headset disclosed herein or existing headsets with standard jacks and one control button.

Therefore, in order for the handset to recognize which type of headset has been connected, the handset preferably includes circuitry to make this determination. In one embodiment, when the headset detects a microphone bias voltage, a predetermined signal may be transmitted by the headset to be decoded by the handset. This may be implemented by simply connecting an output of a controller 66 to the microphone portion of the plug output of the processor. A filter network 71 may also be located along this connection in order to reduce noise.

The circuitry 62 includes the controller 66, such as a processor, preferably having low power consumption and a battery 68. The battery 68 is preferably a rechargeable battery or a super capacitor which may be charged by a microphone bias when the headset is connected to the mobile communication device. If a microphone bias is used, a voltage boost circuit is likely to be required to boost the voltage on the microphone bias to above 1.8 V. Alternatively, the battery may be a one-time use battery and replaced when the power has been entirely discharged from the battery 68.

A series of switches 70, representing each button on the multi-button control, is connected to the processor 66. In FIG. 3, the switches 70 have been labeled as B1, B2, B3, B4, B5 and B6. For instance, B1 may represent a mute button, B2 may represent a volume up button, B3 may represent a volume down button, B4 may represent a rewind button, B5 may represent a fast forward button and B6 may represent a play/stop button. As will be understood, the number of switches is limitless but is dependent on the physical size of the multi-button control. Each of the switches is also connected to ground 72. Within the processor is a memory, or database 67, for storing control information and a module 69 for determining which switch 70 has been pressed.

In the present embodiment, an output of the processor 66 is connected to the FET 64. As will be described below with respect to the operation of the control 60, this connection provides the necessary signals to control the handset.

Figure 4:
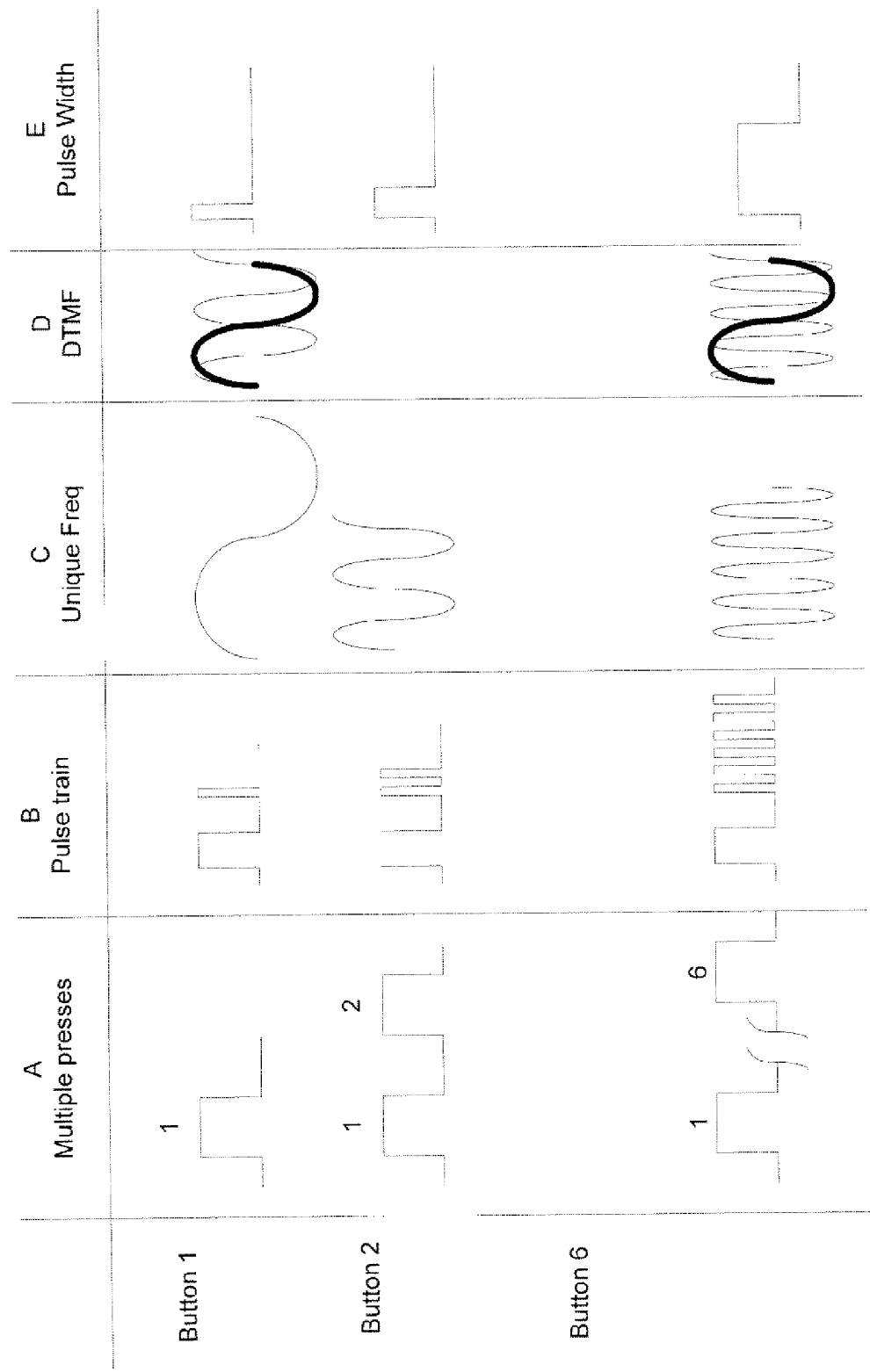
FIG. 4 is a diagram of coding schemes for use with the headset.

FIG. 4 provides examples of various methods of encoding the control signals being transmitted from the headset to the handset. Encoding control signal mode A is directed at multiple presses, encoding control signal mode B is directed at pulse trains, encoding control signal mode C is directed at unique frequencies, encoding control signal mode D is directed a dual tone multiple frequency (DTMF) and encoding control signal mode E is directed at pulse width. It will be understood that each headset preferably operates in only one of the encoding control signal modes but in some embodiments, the headset may operate under multiple control signal modes depending on the required functionality.

In this embodiment, the circuitry is implemented for a multi-button control 60 operating under control signal mode A, control signal mode B or control signal mode E, as shown in FIG. 4. As will be understood, each headset preferably operates in a single control signal mode. However, it will be understood that some embodiments may employ multiple control signal modes. When one of the series of switches 70, or buttons, is pushed, a signal is transmitted to the processor 66 from the switch. The module 69 within the processor 66 receives this signal (step 200 of FIG. 6) and then determines which of the switches 70 has been pressed (step 202). After determining the switch, the module then accesses the database 67 to determine a control signal corresponding to or associated with the pressed switch 70 (step 204).

For instance, if the user wishes to play music, after pressing B6, the software module 69 determines B6 was pressed and accesses the database/memory 67 to determine the signal that needs to be transmitted from the multi-button control to play music.

As shown in FIG. 4, the signal corresponding to B6 for mode A, is a series of 6 pulses. The pulses are then transmitted from the processor 66 to the FET 64. The pulses are recognized by the FET 64 which then translates this pulse signal to the jack 22 (step 206) by shorting out the microphone to ground. The jack 22 then transmits this information to the handset (step 208) which receives the pulse signal. A processor within the handset then processes the pulse signal to determine the command corresponding to the signal transmitted (step 209). In this example, the processor determines that a play music command has been issued and then executes the command and transmits the response to the headset (step 211). Therefore, in this example, the mobile communication device plays music which is then transmitted back through the jack 22 to the headset which then receives the response and transmits the music to the speakers (step 210).

The user is then able to enjoy listening to music on their headset. Similarly, if music is already playing, the user may choose to stop the music, turn the volume up or down by pressing the relevant button. As before, the method outlined in FIG. 6 is performed to transmit the necessary signal to the handset to have the command be performed.

In an alternative embodiment, for instance if the multiple button control was operating in encoding control signal mode B, using a pulse train, the nature of the signals being transmitted from the processor to the headset are shown in FIG. 4. A start pulse is typically transmitted to the FET indicating that a button has been pressed. The start pulse is then followed up with a series of pulses corresponding to the button number that was pressed. For instance if B1 is pressed, a single pulse is provided after the start pulse, if B2 is pressed, two pulses are provided. Similar pulse streams are provided for buttons B3, B4, B5 and B6.

In a more specific example, the start pulse may be a 20 ms pulse with a 10 ms break before the transmission of the stream of control signal pulses, each pulse lasting for 1 ms.

In another embodiment, when square wave pulses are used, the circuitry further includes a set of electronic elements which limit the slew rate of the square wave pulse in order to reduce the potential of the buttons from being heard in the audio transmitted to the speakers. In one embodiment, this may be implemented by adding a resistor/capacitor (RC) network between the FET and the processor 66. Finer slew rate control may be implemented by standard pulse width modulation (PWM) methods.

The pulse train is then transmitted from the FET to the headset 10 via the jack 22. The processor within the headset 10 recognizes the start pulse and processes the following series of pulses to determine which button is pressed. After determining the command from the control, the mobile communication proceeds to execute the demand and the result is transmitted to the user via the speakers.

Figure 5:
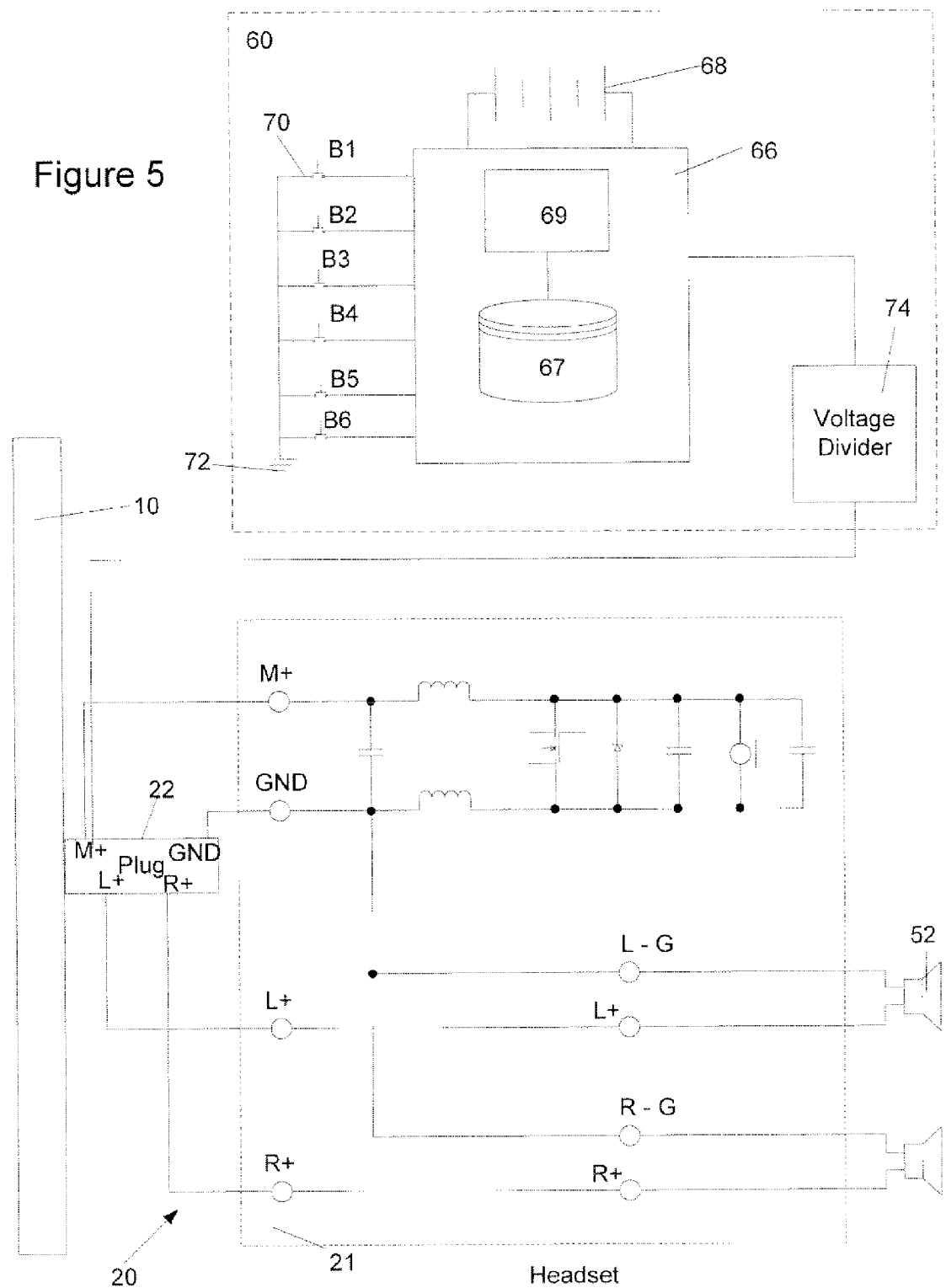
FIG. 5 is a schematic diagram of circuitry for a headset in accordance with another embodiment.

Turning to FIG. 5, a second embodiment of a multiple button control 14 for a mobile communication device 10 is shown. In this embodiment, the output of the processor is directed connected directly to the jack 22, however the output is transmitted through a voltage divider 74 which is used to ensure that the signal being transmitted to the jack is at a predetermined level comparable to the microphone output. Operation of the embodiment is in an identical manner with respect to the method outlined in FIG. 6. However, the nature of the signals being transmitted by the processor differs. In this embodiment, when operating in Mode C, the control signals are transmitted at different frequencies such that the jack transmits the signal to the headset which deciphers the frequency and then performs the requested task. In an alternative embodiment, the output of the processor may also be connected to the FET 64.

In one implementation, if B1 is pressed, the processor 66 transmits a signal at 3400 Hz which is then received by the handset 10 via the jack 22. Once the handset receives a signal at 3400 Hz, the processor recognizes that B1 has been pressed. Similarly, if B2 is pressed, a signal is transmitted at 3600 Hz to the mobile communication device. In order to prevent any interference, each of the frequencies which are selected and associated with the buttons are outside of the audible range so the user does not experience any interference or distraction.

The battery 68 allows the control to be self-sufficient and does not drain the battery within the mobile communication device. Therefore by utilizing a low power processor, the life of the battery 68 is prolonged and does not have to be changed on a constant basis. The importance of the battery is that no additional connection is required from the handset to provide power to the processor in the headset.

If the headset is operating under Mode D, the signals are selected and differentiated using DTMF.

In an alternative embodiment, the processor 66 may be replaced by an Application Specific Integrated Circuit (ASIC) to lower cost, power consumption and size of the control 16.

In an alternative embodiment, where multiple encoding control signal modes are combined, different functionalities may be provided which are controlled via separate control signal modes. For instance Mode A may be used to control an MP3 player while Mode B may be used as a joystick to play a game on the mobile communication device. In this embodiment, the multiple button control includes a switch or control to determine which mode the headset is operating in order to ensure that the encoding is performed correctly by the processor 66. Another embodiment may include the controller 16 being used as a multi-media control in one mode and as a phone dialer in a second mode.

The embodiment having multiple encoding control signal modes may also allow the headset to have a more universal use in that different handsets may require specific encoding control signal modes.

Alternatively, mobile communication devices may operate currently under one mode but in future implementations, may operate under a second mode. In this manner, the headset may be used for both the currently and future versions of a mobile communication device provide more flexibility to the user.

In the preceding description, for purposes of explanation, numerous details are set forth in order to provide a thorough understanding of the embodiments of a novel headset. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

The above-described embodiments of the invention are intended to be examples only, Alterations, modifications and variations can be effected to the particular embodiments by those of skill in the art without departing from the scope of the invention, which is defined solely by the claims appended hereto.

What is claimed is:

1. A headset for use with a mobile communication device for wireless voice and data communication, said headset comprising:
    a jack plug sized and shaped to be received in a port in said mobile communication device,
    first and second speakers,
    speaker wires connecting the first and second speakers to the jack plug,
    a microphone,
    a microphone wire connecting the microphone to the jack plug,
    a ground wire coupled to the jack plug,
    a plurality of control buttons, said control buttons comprising a first button to increase speaker volume and a second button to decrease speaker volume, and
    a controller coupled to the buttons for receiving input commands and coupled to the microphone wire for transmitting a control signal to the jack plug, wherein the control signal is encoded in an encoding control signal mode comprising a series of voltage pulses, each pulse representing a difference in voltage across the microphone wire relative to the ground wire, said controller being configured to transmit a first pulse series in response to activation of the first button to input a command to increase speaker volume and a second pulse series in response to activation of the second button to input a command to decrease speaker volume.

2. The headset as claimed in claim 1 wherein the plurality of control buttons further comprises a play/stop button, said controller being configured to transmit a pulse series in response to activation of the play/stop button.

3. The headset as claimed in claim 1 wherein the plurality of control buttons further comprises a fast forward button, said controller being configured to transmit a pulse series in response to activation of the fast forward button.

4. The headset as claimed in claim 1 wherein the plurality of control buttons further comprises a rewind button, said controller being configured to transmit a pulse series in response to activation of the rewind button.

5. The headset as claimed in claim 1, wherein the controller comprises a processor.

6. The headset as claimed in claim 1, wherein the controller comprises an application specific integrated circuit.

7. A headset for use with a mobile communication device, the headset comprising:
- a jack plug adapted to be received in a port of the mobile communication device;
- first and second speakers;
- a microphone;
- a multi-button control unit comprising a processor and a plurality of control buttons including a first control button and a second control button, the processor adapted to detect activation of any of the plurality of control buttons and, responsive to the detected activation, cause a control signal to be transmitted to the jack plug; and
- first and second speaker wires connecting the first and second speakers to the jack plug, and a microphone wire connecting the microphone to the jack plug;
- wherein the processor is adapted to transmit a control signal that is encoded such that activation of the first control button causes the controller to transmit the control signal in a first configuration that causes the mobile communication device to perform a first function, and activation of a second control button causes the processor to transmit the control signal in a second configuration that causes the mobile communication device to perform a second function, and wherein the control signal is transmitted to the jack plug using the microphone wire with an encoding control signal mode comprising a series of voltage pulses, each pulse representing a difference in voltage across the microphone wire relative to a ground wire.

8. The headset of claim 7, wherein the processor is adapted to encode the control signal in a mode selected from the group consisting of: a multiple presses control signal mode, a pulse train control signal mode, a unique frequency control signal mode, and a dual tone multiple frequency (DTMF) control signal mode.

9. The headset of claim 7, wherein the first function comprises an increase speaker volume function, and the second function comprises a decrease speaker volume function.

10. The headset of claim 9, wherein the plurality of control buttons includes a third control button, the processor being effective, in response to activation of the third control button, to transmit the control signal in a third configuration that causes the mobile communication device to perform a third function, the third function comprising a play/stop function.

11. The headset of claim 9, wherein the plurality of control buttons includes a third control button and a fourth control button, the processor being effective, in response to activation of the third control button, to transmit the control signal in a third configuration that causes the mobile communication device to perform a third function, the third function comprising a rewind function, and the processor being effective, in response to activation of the fourth control button, to transmit the control signal in a fourth configuration that causes the mobile communication device to perform a fourth function, the fourth function comprising a fast forward function.

12. The headset of claim 9, wherein the plurality of control buttons includes a third control button, the processor being effective, in response to activation of the third control button, to transmit the control signal in a third configuration that causes the mobile communication device to perform a third function, the third function comprising a mute function.

13. A headset for use with a mobile communication device, the headset comprising:
- a jack plug adapted to be received in a port of the mobile communication device;
- first and second speakers;
- a microphone;
- a multi-button control unit comprising a plurality of control buttons and a processor adapted to detect activation of any of the plurality of control buttons, the processor being effective to cause, responsive to the detected activation of any of the plurality of control buttons, an encoded control signal to be transmitted to the mobile communication device via the jack plug; and
- first and second speaker wires connecting the first and second speakers to the jack plug, and a microphone wire connecting the microphone to the jack plug;
- wherein the multi-button control unit is connected to the microphone wire, and wherein the encoded control signal comprises a series of voltage pulses, each pulse representing a difference in voltage across the microphone wire relative to a ground wire, and is transmitted to the jack plug; and
- wherein the processor is adapted to generate a first command via the encoded control signal to increase speaker volume in response to activation of a first control button of the plurality of control buttons, and the processor is adapted to generate a second command via the encoded control signal to decrease speaker volume in response to activation of a second control button of the plurality of control buttons.

14. The headset of claim 13, wherein the processor is adapted to generate the first and second commands via the encoded control signal through a mode selected from the group consisting of: a multiple presses control signal mode, a pulse train control signal mode, a unique frequency control signal mode, a dual tone multiple frequency (DTMF) control signal mode, and a pulse width control signal mode.

15. The headset of claim 13, wherein the processor is adapted to generate a third command via the encoded control signal to perform a play/stop function in response to activation of a third control button of the plurality of control buttons.

16. The headset of claim 13, wherein the processor is adapted to generate a third command via the encoded control signal to perform a rewind function in response to activation of a third control button of the plurality of control buttons, and the processor is adapted to generate a fourth command via the encoded control signal to perform a fast forward function in response to activation of a fourth control button of the plurality of control buttons.

17. The headset of claim 13, wherein the processor is adapted to generate a third command via the encoded control signal to perform a mute function in response to activation of a third control button of the plurality of control buttons.

* * * * *